US012732593B2

(12) United States Patent
Petrov

(10) Patent No.: US 12,732,593 B2
(45) **Date of Patent: *Sep. 8, 2026**

(54) MASKING VIDEO FEEDBACK LOOP DURING SCREEN SHARING

(71) Applicant: RingCentral, Inc., Belmont, CA (US)

(72) Inventor: Aleksei Petrov, Redwood City, CA (US)

(73) Assignee: RingCentral, Inc., Belmont, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 18/906,006

(22) Filed: Oct. 3, 2024

(65) Prior Publication Data

US 2025/0030817 A1 Jan. 23, 2025

Related U.S. Application Data

(63) Continuation of application No. 18/213,393, filed on Jun. 23, 2023, now Pat. No. 12,137,303, which is a continuation of application No. 16/382,466, filed on Apr. 12, 2019, now Pat. No. 11,729,356, which is a continuation of application No. 16/035,540, filed on Jul. 13, 2018, now Pat. No. 10,306,184.

(51) Int. Cl.

| | |
|---|---|
| ***H04L 65/401*** | (2022.01) |
| ***G06F 3/14*** | (2006.01) |
| ***H04L 12/18*** | (2006.01) |
| ***H04M 3/56*** | (2006.01) |
| ***H04N 7/14*** | (2006.01) |
| ***H04N 7/15*** | (2006.01) |

(52) U.S. Cl.

CPC ........... *H04N 7/157* (2013.01); *G06F 3/1462* (2013.01); *H04L 12/1813* (2013.01); *H04L 65/4015* (2013.01); *H04M 3/567* (2013.01); *H04N 7/147* (2013.01)

(58) Field of Classification Search

CPC ...... H04N 7/157; H04N 7/147; G06F 3/1462; H04L 12/1813; H04L 65/4015; H04L 12/1827; H04M 3/567; G09G 5/14

See application file for complete search history.

(56) References Cited

U.S. PATENT DOCUMENTS

| | | | | |
|---|---|---|---|---|
| 9,197,856 | B1 * | 11/2015 | Tangeland | H04N 7/152 |
| 9,798,933 | B1 * | 10/2017 | Meisser | H04N 23/90 |
| 2014/0344658 | A1 * | 11/2014 | Srinivasan | G06F 40/279<br>715/205 |
| 2015/0371014 | A1 * | 12/2015 | Raley | G09G 5/395<br>726/26 |

* cited by examiner

*Primary Examiner* — Han Hoang

(57) ABSTRACT

A method includes capturing a first image associated with a portion of a display screen being shared. The method further includes rendering the first image in a preview window of the display screen being shared to form a second image. The second image is captured so as to determine whether the first image is duplicated in the second image. The duplication of the first image in the second image is masked to form a third image. The third image is rendered in the preview window.

20 Claims, 14 Drawing Sheets

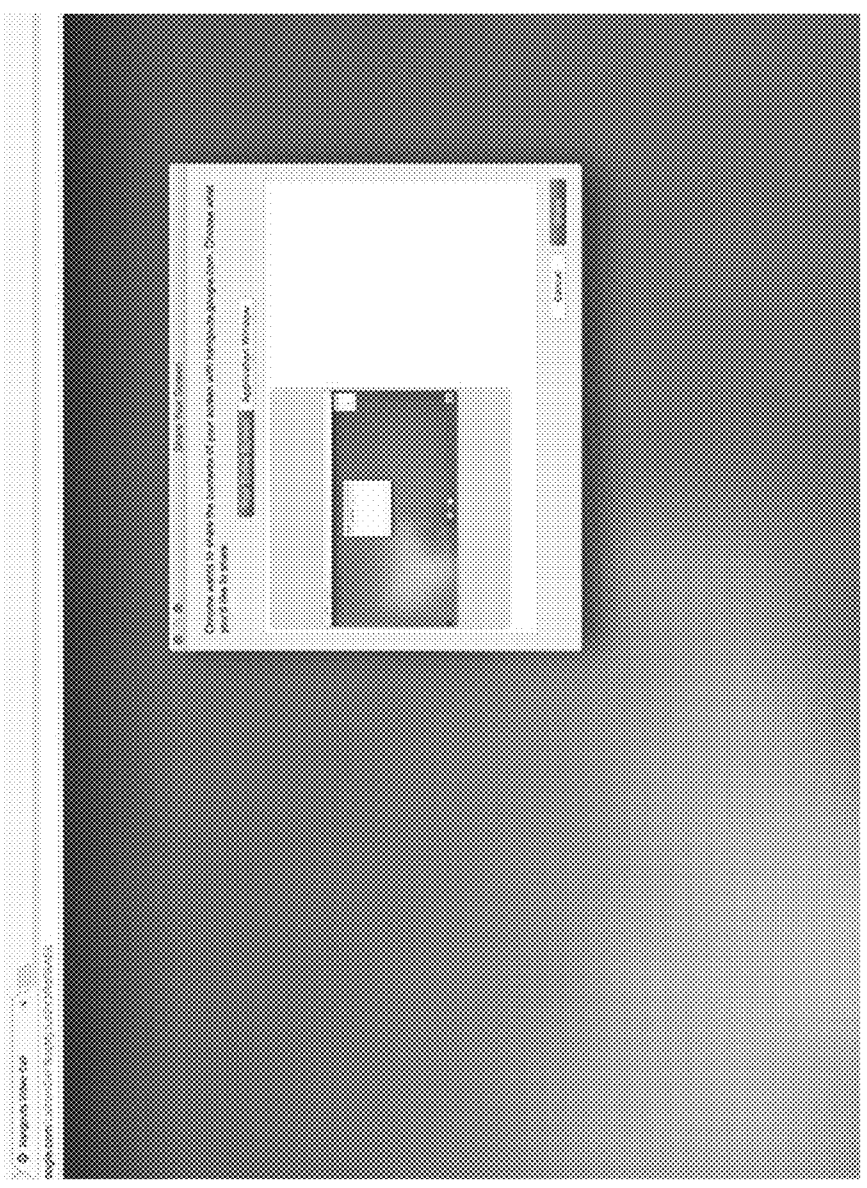
FIGURE 1A

MASKING VIDEO FEEDBACK LOOP DURING SCREEN SHARING

RELATED APPLICATIONS

The instant application is a continuation application, which claims the benefit and priority to the U.S. patent application Ser. No. 18/213,393 that was filed on Jun. 23, 2023, which is a continuation application, which claims the benefit and priority to the U.S. patent application Ser. No. 16/382,466 that was filed on Apr. 12, 2019, which is a continuation application, which claims the benefit and priority to the U.S. patent application Ser. No. 16/035,540 that was filed on Jul. 13, 2018, which are incorporated herein by reference in their entirety.

TECHNICAL FIELD

The present disclosure relates to the field of computer supportive collaborative work between users. More specifically, and without limitations, this disclosure relates to systems and method of sharing content online through screen sharing and to mask video feedback loop within the preview window.

BACKGROUND

Online collaboration between various entities and/or individual users throughout the same organization and/or different organizations has increased with the advent of the Internet. For example, it is commonplace for colleagues within the same organization to collaborate on a project online even though they may be a world apart using an online collaboration tool. Similarly, users from different organizations may be able to collaborate online, even though they may be spread throughout the world. Many tools have been introduced to allow online collaboration. For example, Google™ Hangout can be used to share content online among the users, for example, by screen sharing. The user sharing content, by screen sharing may wish to preview the content (i.e. screen) being shared to make sure that the desired content is being shared without sharing the user's private information or information that is not relevant to the sharing. A screen preview, however, causes a video feedback loop, as shown in FIGS. 1A-1F. FIGS. 1A-1F illustrate that the video feedback loop becomes worst as time goes on because the number of preview windows within the preview window increases over time. The video feedback loop results from the shared screen that includes the preview window being rendered multiple times within the preview window. The video feedback loop is partially due to the shared screen being captured at certain time intervals and the preview window within the shared screen also being captured multiple times over time causing it to be duplicated. The video feedback loop makes it difficult for the user sharing the screen and previewing it to distinguish between the screens being duplicated within the preview window.

SUMMARY

Accordingly, there is a need to address the video feedback loop during screen sharing. The present disclosure seeks to address the undesirable video feedback loop by masking the undesirable video feedback loop in the preview window. In some embodiments, the video feedback loop that may occur within the preview window is detected. For example, the preview window that is being duplicated within the preview window is detected. According to some example embodiments, the preview window that is being duplicated, e.g., more than once, is masked over to improve visual appeal of the preview window and to reduce confusion of the user sharing a screen and previewing the shared screen.

In some example embodiments, a method includes capturing a first image associated with a portion of a display screen being shared. The method further includes altering a brightness of the first image that is captured to form a second image. In some embodiments, the second image is rendered in a preview window of the display screen being shared to form a third image. The third image may be captured. A brightness of the third image that is captured may be altered to form a fourth image. It is appreciated that it may be determined whether the fourth image comprises duplication of the second image by comparing brightness associated with the fourth image to brightness associated with the second image. Responsive to determining that the fourth image comprises the duplication of the second image, the duplication of the second image in the fourth image is masked to form a fifth image. The fifth image may be rendered in the preview window to form a sixth image.

It is appreciated that the masking may include superimposing a black window over the duplication of the second image in the fourth image. In some embodiments, the altering the brightness of the first image includes increasing brightness of the first captured image by a predetermined amount and the altering the brightness of the third image includes decreasing brightness of the third image by the predetermined amount. According to some embodiments, the altering the brightness of the first image includes decreasing brightness of the first captured image by a predetermined amount and the altering the brightness of the third image includes increasing brightness of the third image by the predetermined amount.

In some examples, the method may further include capturing the sixth image, altering a brightness of the sixth image that is captured to form a seventh image, determining whether the sixth image includes the fourth image by comparing brightness associated with the fourth image to the altered brightness of the sixth image, responsive to determining that the sixth image includes the duplication of the fourth image, masking the duplication of the fourth image in the sixth image to form an eighth image, and rendering the eighth image in the preview window.

In some embodiments, the altering the brightness is substantially undetectable by human eye. It is appreciated that the masking may include superimposing an image over the duplication of the second image.

In some embodiments a method includes capturing a first image associated with a portion of a display screen being shared. The method may further include altering an aspect of the first image that is captured to form a second image. It is appreciated that the method may further include rendering the second image in a preview window of the display screen being shared to form a third image. The third image may be captured. It is appreciated that the method may further include altering an aspect of the third image that is captured to form a fourth image. It may be determined whether the fourth image includes duplication of the second image. Responsive to determining that the fourth image includes the duplication of the second image, the duplication of the second image in the fourth image is masked to form a fifth image. The fifth image is rendered in the preview window to form a sixth image.

According to some embodiments, the aspect is selected from a group comprising brightness, color, and transparency.

It is appreciated that in some embodiments, the capturing is in RGB format, and the method may further include converting the RGB format into YCrCb format, and that the altering includes altering Y, Cr, or Cb. It is appreciated that the altered YCrCb format may be converted to RGB format.

It is appreciated that the determining may include comparing brightness associated with the fourth image to brightness associated with the second image. The method may further include capturing the sixth image, altering an aspect of the sixth image that is captured to form a seventh image, determining whether the sixth image comprises the fourth image by comparing the aspect associated with the fourth image to the aspect of the seventh image, responsive to determining that the sixth image includes the duplication of the fourth image, masking the duplication of the fourth image in the sixth image to form an eighth image, and rendering the eighth image in the preview window.

In some embodiments, the altering the aspect may be substantially undetectable by human eye. The masking may include superimposing an image over the duplication of the second image.

It is appreciated that in some embodiments, a method includes capturing a first image associated with a portion of a display screen being shared. The first image may be rendered in a preview window of the display screen being shared to form a second image. The second image may be captured. In some embodiments, it may be determined whether the first image is duplicated in the second image. It is appreciated that the duplication of the first image in the second image may be masked to form a third image. The third image may be rendered in the preview window.

It is appreciated that in some embodiments, the method may further include altering the captured first image prior to rendering in the preview window to form the second image. The altering may be substantially undetectable by human eye. According to some embodiments, the method may further include altering the third image prior to rendering the third image in the preview window. The altering the third image may be substantially undetectable by human eye.

It is appreciated that the altering the third image may be by a same amount and opposite to the altering the first image. It is appreciated that the altering may be selected from a group comprising brightness, color, and transparency. According to some embodiments, the masking may include superimposing an image over the duplication of the first image in the preview window.

These and other features and aspects of the concepts described herein may be better understood with reference to the following drawings, description, and appended claims.

BRIEF DESCRIPTION OF DRAWINGS

FIGS. 1A-1F are screenshots depicting the video feedback loop of Google™ Hangout.

DETAILED DESCRIPTION

Figure 1B:
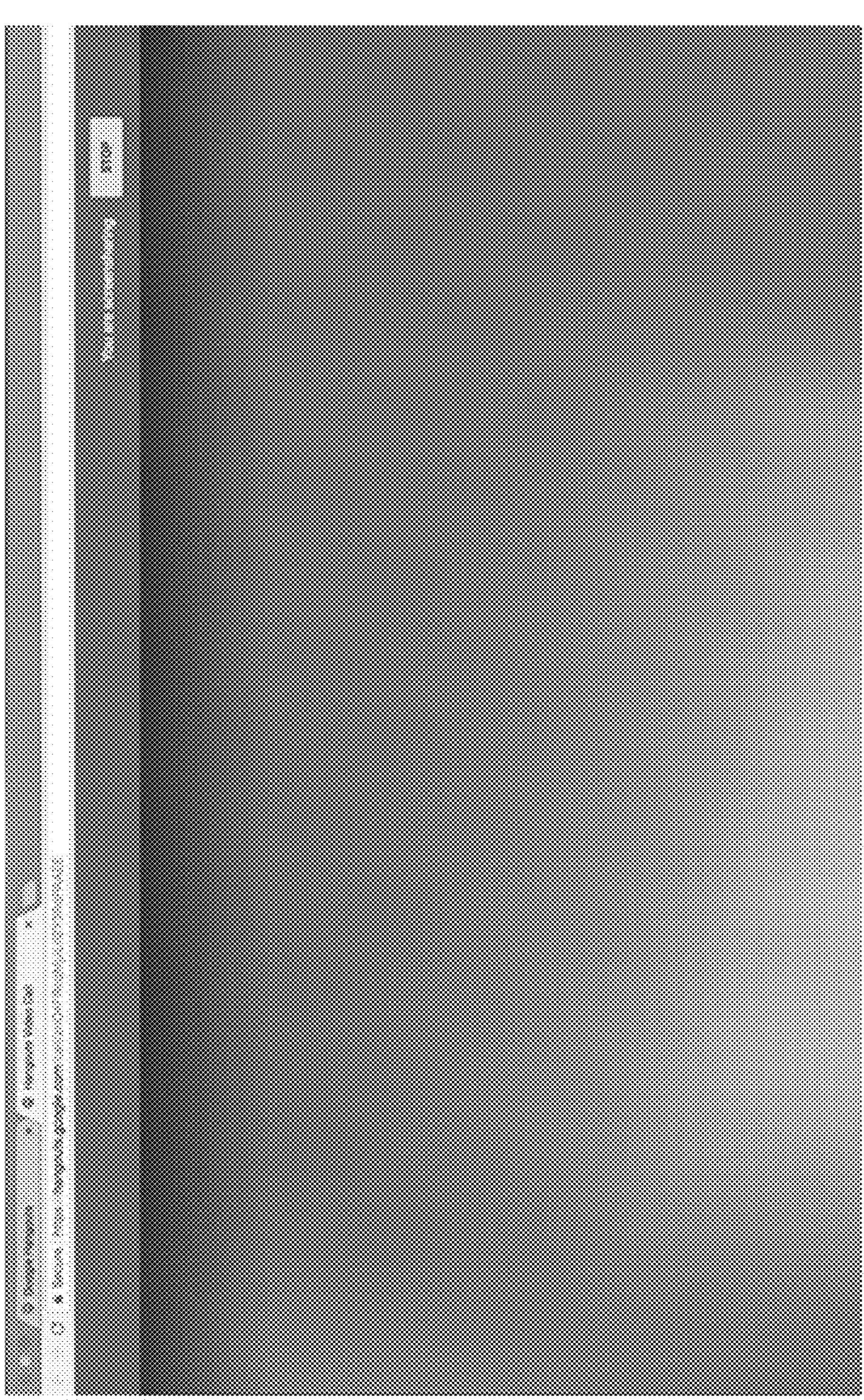
Figure 1C:
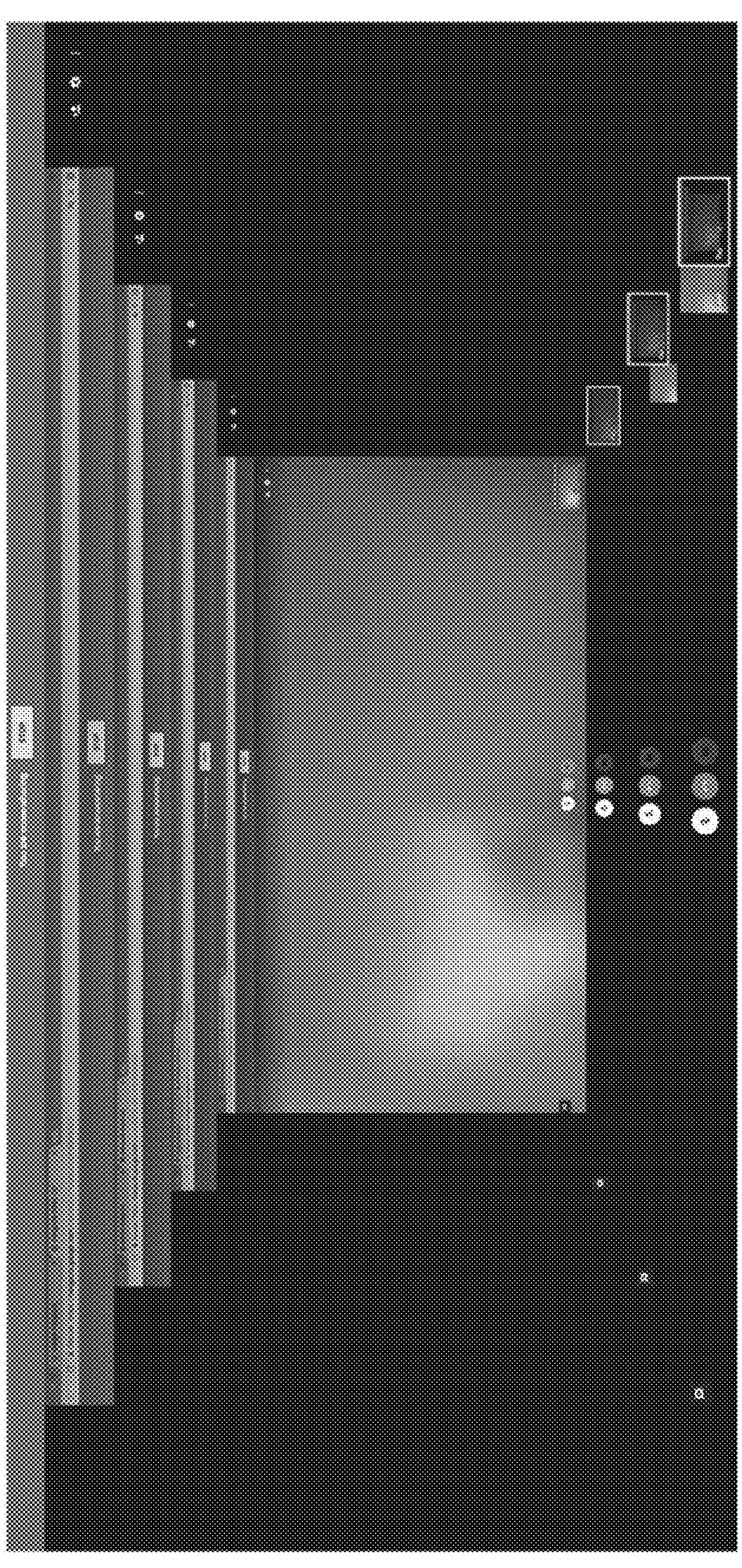
Figure 1D:
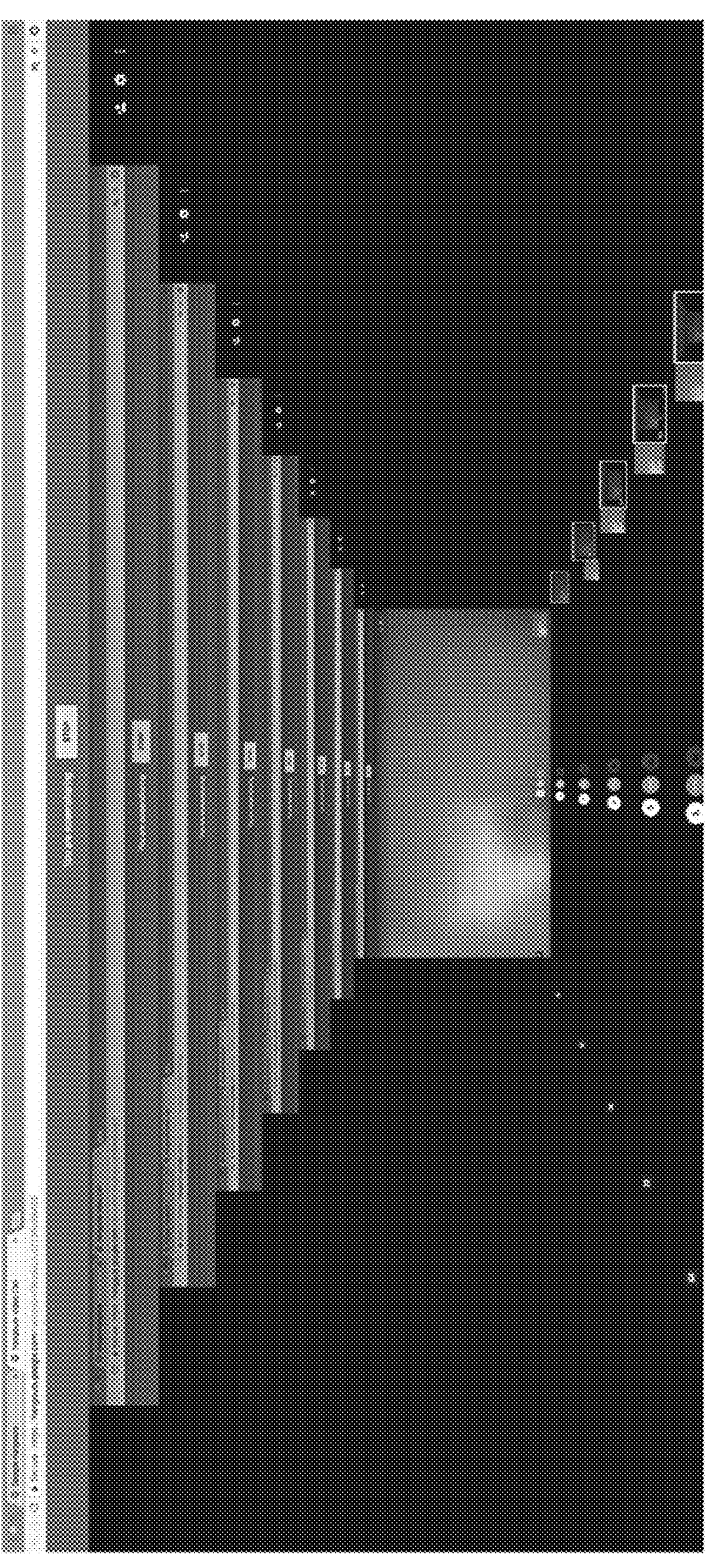
Figure 1E:
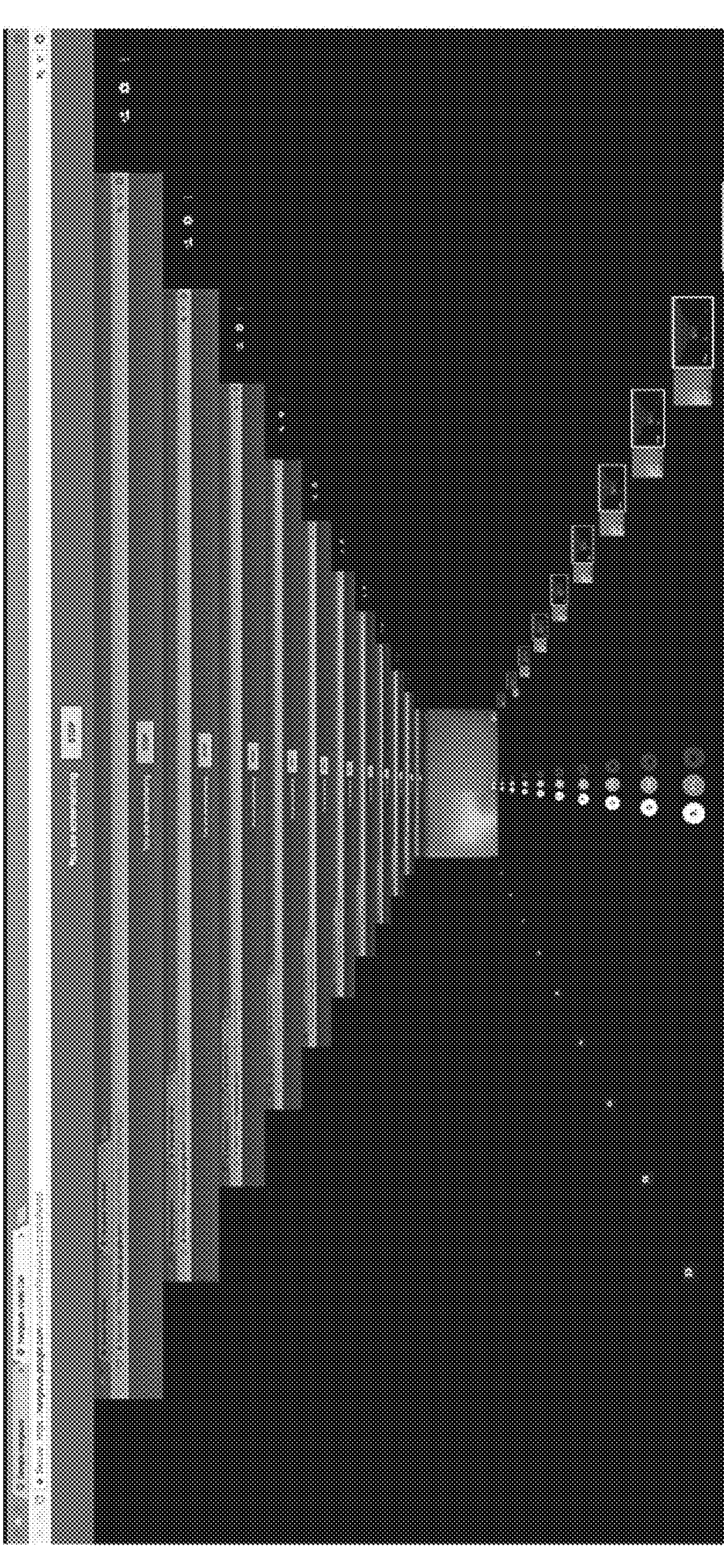
Figure 1F:
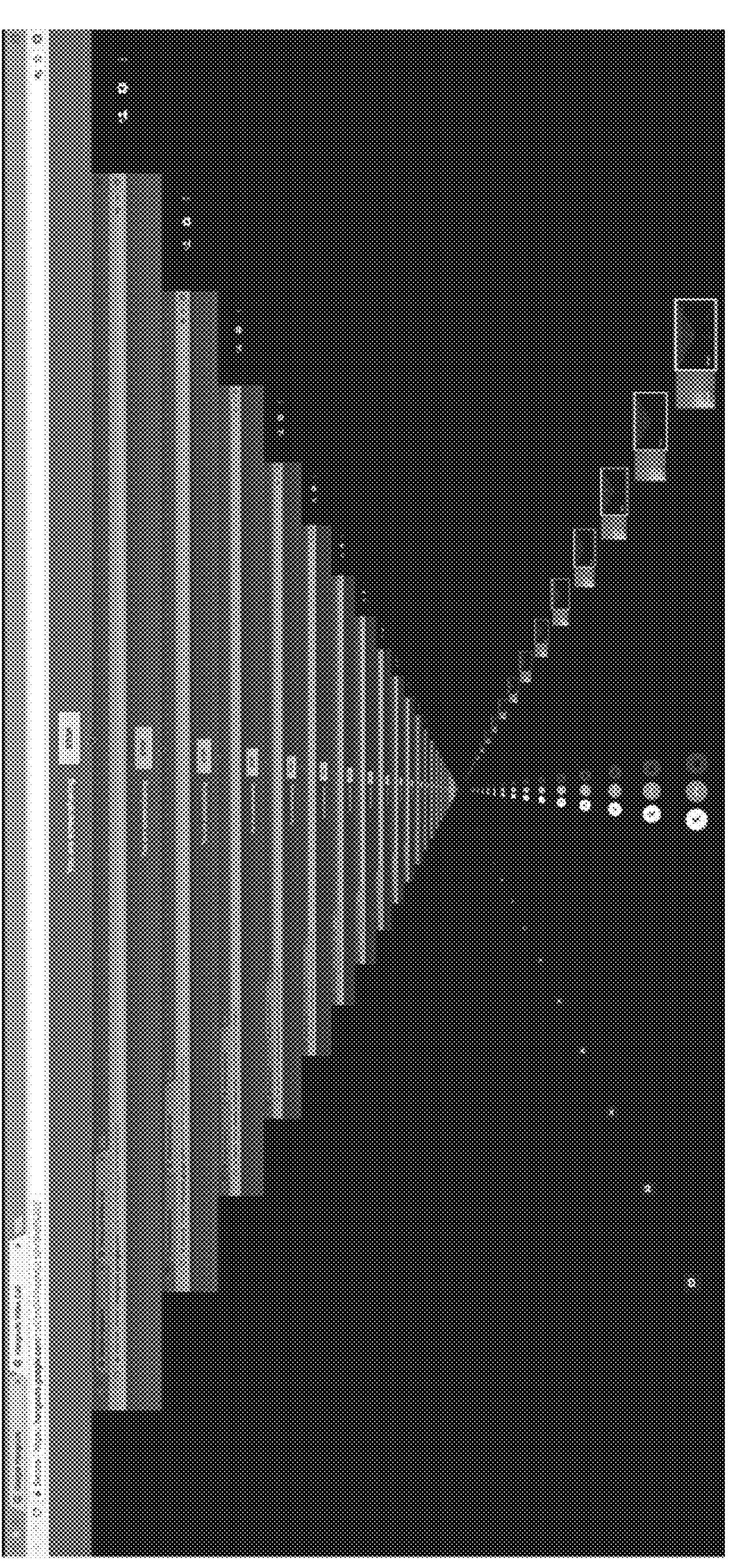

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "capturing", "altering", "rendering", "masking", "increasing", "decreasing", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

There is a need to address the video feedback loop during screen sharing. In some embodiments, the video feedback loop is detected. For example, the shared screen that includes the preview window that is being duplicated within the preview window is detected. According to some embodiments, the preview window that is being duplicated, e.g., more than once, is masked over. Masking the duplicated window reduces confusion because the user sharing the screen may easily distinguish between the shared screen and the preview window. Furthermore, masking over the duplicated window improves the visual appeal of the preview window by preventing the rendition of the content being duplicated in the preview window.

In a collaborative environment, it might be beneficial to share content online. For example, during an online meeting such as WebEx or other collaborative environment it might be beneficial to share power point, simulation results, video clip, etc. related to the meeting. As one example, a presenter may share a content that is being displayed within a window of his screen with other members of the collaborative environment online and in real time. The shared content and its sharing in real time enables the team members to follow the discussion as the presenter presents. It is beneficial for the user that is sharing the screen with other members to have the ability to preview the information that is being shared. For example, in the example of the presenter sharing a power point it may be beneficial to preview and know for a fact that the screen being shared is the power point, as intended, and not unintended content, e.g., personal email, unrelated projects, etc. The preview window may be rendered by display modules on the display of the user that is sharing the screen.

In some example embodiments, a processor may receive data, e.g., pixel information, brightness information, etc., associated with rendition of a shared screen that is being rendered by a display, e.g., an LCD display, etc. The received data (hereinafter referred to as first data) is altered by the processor or a graphics unit prior to the data being rendered in a preview window of the display screen. For example, the brightness of the received data may be altered by increasing or decreasing the brightness in a manner that is substantially undetectable by human eye. The processor may subsequently receive additional data, e.g., pixel information, brightness information, etc., associated with the rendition of the shared screen (hereinafter referred to as second data) that may now include data associated with the rendition of content within the preview window. The processor or the graphics unit alters the second data, e.g., increasing or decreasing the brightness in a manner that is substantially undetectable by human eye. In some example embodiments, the second data is altered in equal value but opposite to the first data. For example, if the brightness of the first data is increased by a certain amount, the brightness of the second data is decreased by the same amount. The processor compares the brightness of the first data to that of the second data in order to identify duplication of content responsive to finding a match. The processor and/or graphics unit generates a mask, e.g., a black window, that is superimposed over the duplicated content.

Figure 2A:
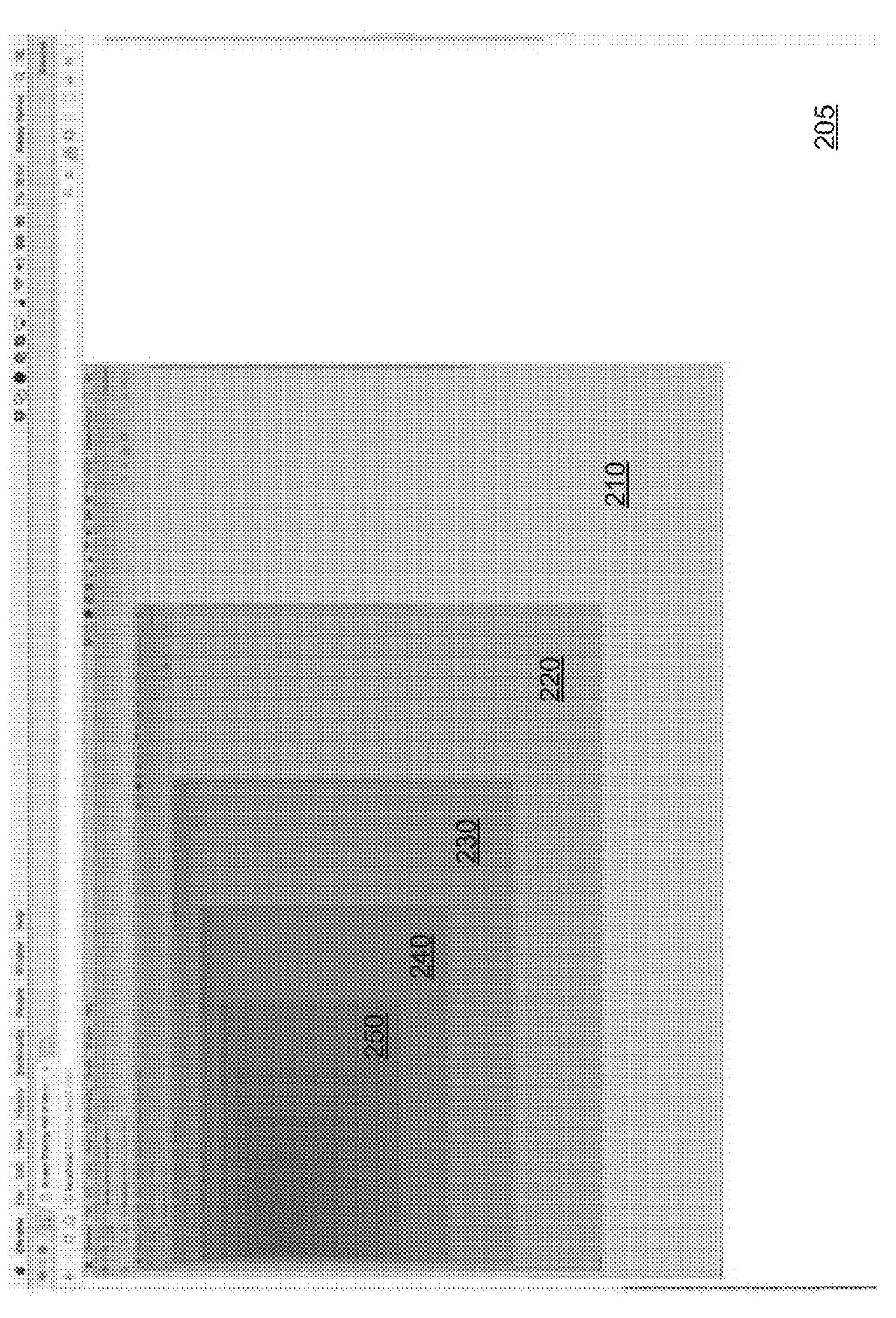
FIGS. 2A and 2B are screenshots showing a preview window of a screen being shared before and after masking the video feedback loop in accordance with some example embodiments.
Figure 2B:
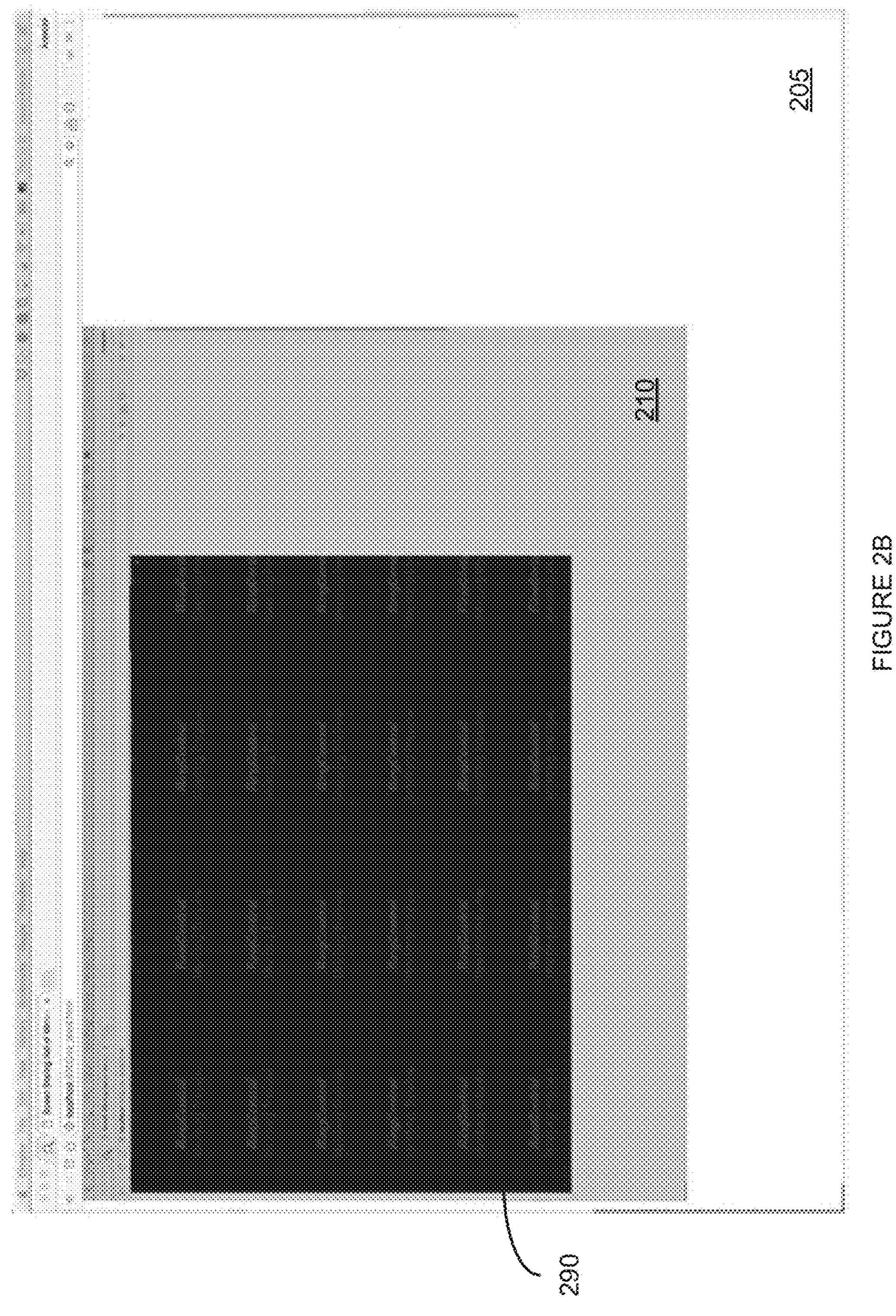

Reference is now made to FIGS. 2A and 2B, which illustrate a preview window of a screen being shared before and after masking the video feedback loop in accordance with example embodiments of the present disclosure. The collaborative environment for users to join and collaborate on projects may include a feature to allow one or more users to share content being rendered on their screen with other users. For example, the feature enabling screen sharing may be through drag and drop of a document into a particular window or by simply dragging a document to be shared into a window being shared (i.e. active window). In some example embodiments, a browser and/or an application programming interface (API) may be used to identify the active area or window for sharing. Referring specifically to FIG. 2A, the preview window 210 is rendered on the display device of the user sharing the screen. The screen being shared may be the entire screen for the user sharing content or it may be a portion thereof. It is appreciated that one or more users may share their screen simultaneously, if desired. Moreover, it is appreciated that the content being shared in the shared screen is rendered on a display device, of the user sharing the content, by a processor and/or graphics unit.

Some collaborative environments allow the user sharing a window to preview the screen that is being shared. For example, the preview window 210 displays the screen being shared 205 at a first instance in time, e.g., at time $t_0$. The preview window 210 may be a window that is rendered on a display device of the user sharing the screen by a processor and/or graphics unit. The preview window 210 may be rendered within a portion of the screen being share.

The processor associated with the user sharing the screen may receive data regarding the content being rendered (i.e. shared screen) on a display device at some time intervals. In other words, the data associated with the screen being shared may be captured at some time intervals, e.g., regular intervals, irregular intervals, etc. For example, the screen being shared may be captured every second, or every ½ second, etc., in order to display the screen being shared in the preview window 210. In some example embodiments, the data associated with the screen being shared is captured by a graphics unit or a processor. For example, data within a graphics pipeline may be used and/or the data that is being rendered on a display device is received by a processor or a memory component. The screen being shared 205 is updated to include the preview window 210 displaying the screen being shared. Subsequent to time $t_0$, at time $t_1$, the screen that is being shared that now includes the preview window 210 is captured again in order to be previewed in the preview window, causing the video feedback loop, as displayed by window 220. The data associated with the screen being shared including the data associated with the preview window is received in some time intervals by the processor and/or graphics unit and/or memory component. In other words, the process of capturing data associated with the screen being shared and the content of the preview window is repeated at some frequency causing additional video feedback loops 230-250. As shown, the video feedback loop can be confusing and visually unappealing.

Referring now to FIG. 2B, the content being duplicated in the preview window 210 is detected according to method that are described in FIGS. 3A-3B, 4A-4B and 5. For example, video feedback loop windows 220-250, as shown in FIG. 2A, is detected by a processor. The content being duplicated 205 is then masked by another window, e.g., window 290, by using a processor or a graphics unit. In other words, the content being duplicated is visually blocked, thereby providing visually more appealing and user friendly preview window 210. The masking window 290 may be a black window that blocks the duplicated content from being viewed. The methods by which the content being duplicated is detected and masked is described in FIGS. 3A-3B, 4A-4B, and 5. Accordingly, the shared screen and the preview window are more distinguishable from one another as well as with screens that are not being shared, thereby improving the visual appeal of the screen being shared along with the preview window. Moreover, the functionality is improved by further enabling easy navigation between the shared screen, preview window, and screens that are not being shared.

Figure 3A:
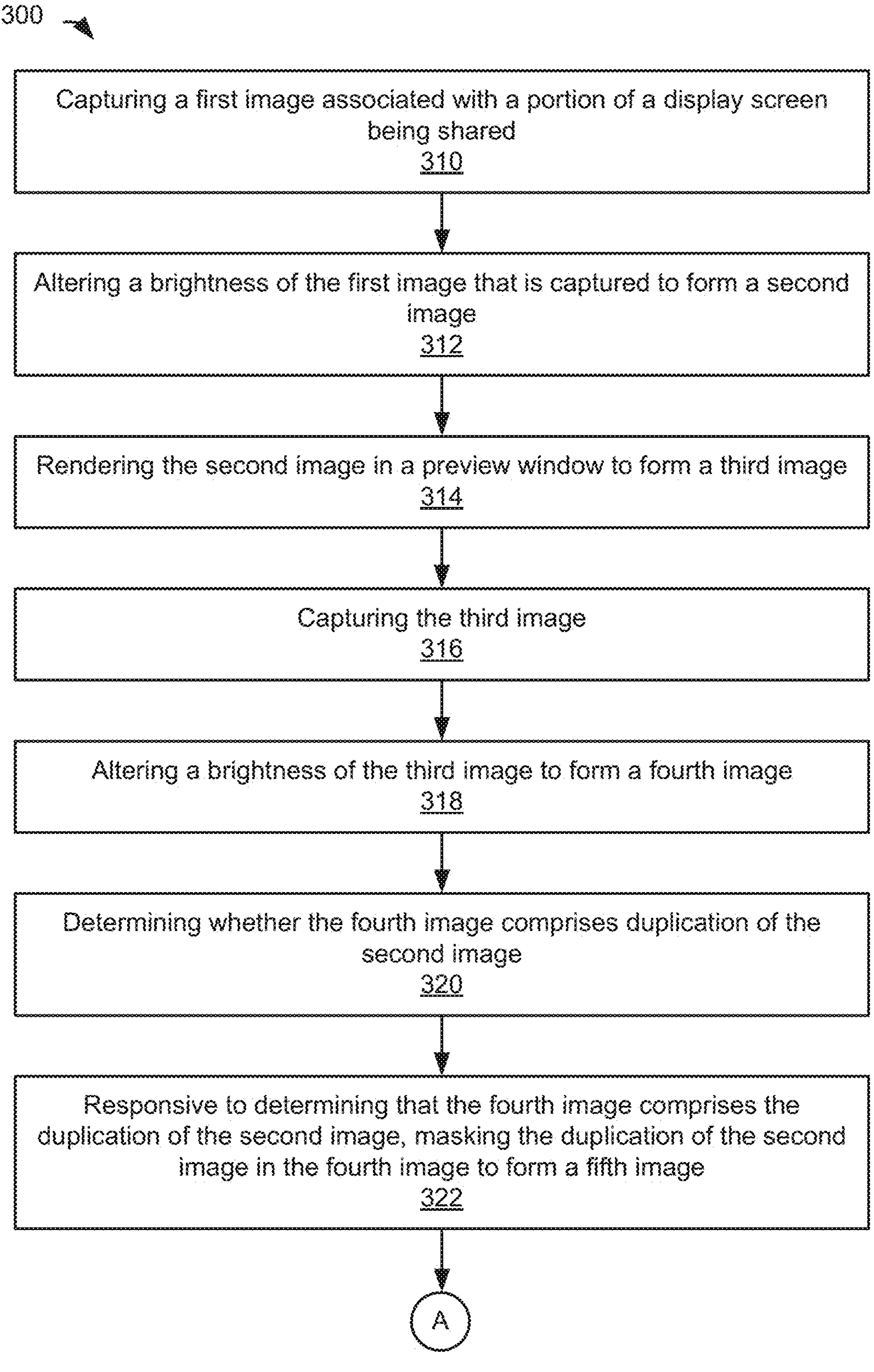
FIGS. 3A-3B are flow charts illustrating an example of method flow for masking video feedback loop in accordance with some embodiments.
Figure 3B:
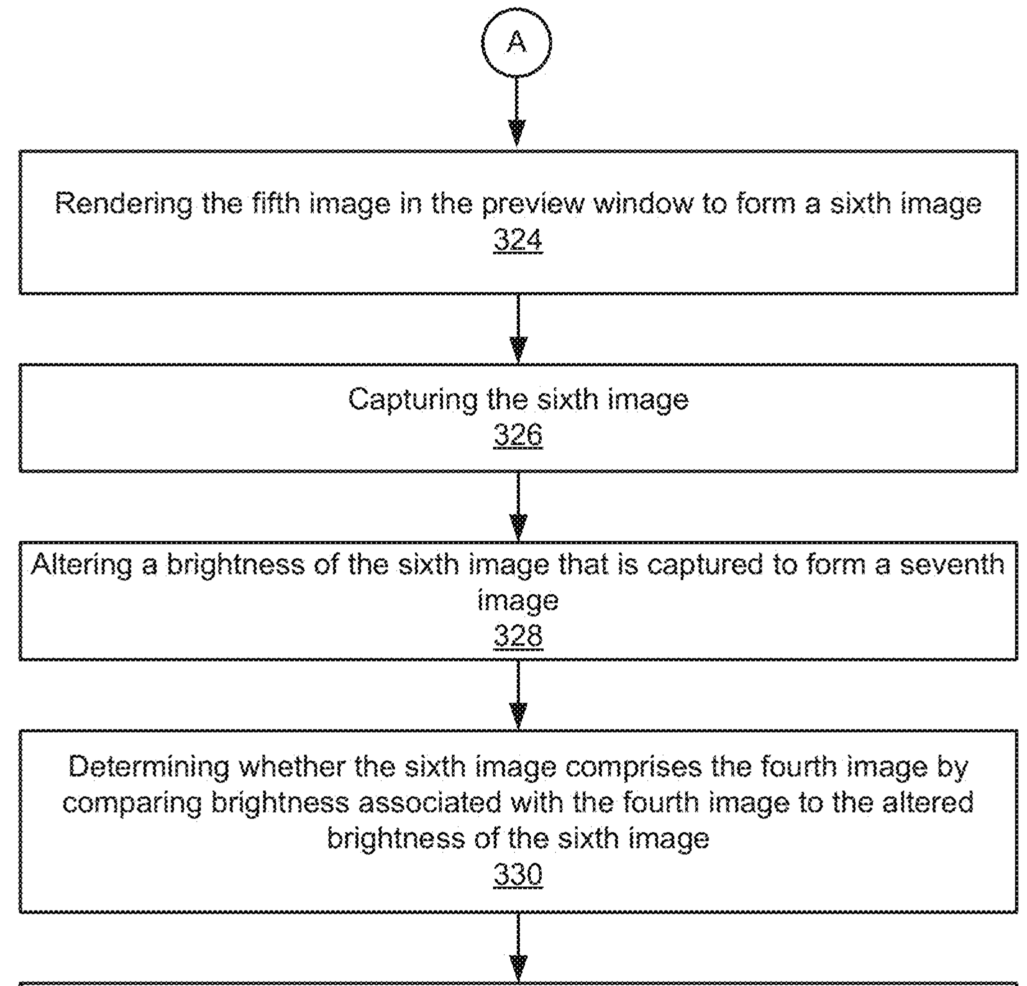

Referring now to FIGS. 3A-3B, an example of method flow 300 for masking the video feedback loop in accordance with some embodiments is shown. At step 310 a first image associated with a display screen being shared is captured. For example, data associated with the screen being shared 205 is received by a processor, graphics unit, a memory component, etc., in order to be previewed in a preview window. The preview window is rendered by the processor and/or graphics unit on a display device and within the screen being shared. At step 312, the brightness of the first image that is captured is altered to form a second image, e.g., as displayed by window 210. For example, the brightness may be altered by the graphics unit and/or processor. It is appreciated that the brightness is altered in such a way that the alteration is substantially undetectable by human eye. In some embodiments, the brightness may be increased by a small amount that is predetermined. However, it is appreciated that in some embodiments the brightness may be decreased by a small amount. It is appreciated that while the alteration of the images is described with respect to altering the brightness, the example embodiments are not limited thereto and alteration of brightness should not be construed as limiting the scope of the embodiments. For example, in some embodiments altering the image may be by inserting a substantially unperceivable pixel or removing a pixel in such a way that is substantially undetectable by human eye. In other embodiments, the image may be altered by changing a color of one or more pixels in such a way that it is substantially undetectable by human eye.

At step 314, the altered image is rendered in the preview window, e.g., window 210. For example, a processor or a graphics unit may render the altered image in the preview window. Thus, the shared screen may now include windows 205 and 210 forming a third image. At step 316, the third image, e.g., windows 205 and 210, is captured. For example, data associated with the screen being shared 205 and 210 (i.e. third image) is received by a processor, graphics unit, a memory component, etc., in order to be previewed in the preview window. The preview window is rendered by the processor and/or graphics unit on the display device and within the screen being shared. The brightness of the captured third image is altered at step 318 to form a fourth image that includes windows 205, 210, and 220. It is appreciated that in some embodiments, altering the brightness at step 318 is substantially opposite but equal in value to the altering of the brightness at step 312. The brightness may be altered using a processor and/or graphics unit.

At step 320, it is determined whether the fourth image includes duplication of the second image. In some embodiments, the determination may be made by comparing the brightness of the images and finding a match in brightness. The comparison may be done using a processor and/or graphics unit. At step 322, responsive to determining that the fourth image includes a duplication of the second image, a mask may be formed and the duplicated image may be masked, e.g., window 290. In some example embodiments, the mask is formed using a processor and/or graphics unit. In some embodiments, the masking may be by superimposing window 290 over the duplicated image. At step 324, FIG. 3B, the fifth image that includes the masked window 290 may be rendered in the preview window, as shown by windows 205, 210, and 290 to form a sixth image.

At step 326, the sixth image, e.g., windows 205, 210, and 290 is captured. For example, data associated with the screen being shared 205, 210, and 290 (i.e. sixth image) is received by a processor, graphics unit, a memory component, etc., in order to be previewed in the preview window. The preview window is rendered by the processor and/or graphics unit on the display device and within the screen being shared. The brightness of the captured sixth image is altered at step 328 to form a seventh image that includes windows 205, 210, and 290. The brightness may be altered using a processor and/or graphics unit. It is appreciated that in some embodiments, altering the brightness at step 328 is substantially opposite but equal in value to the altering of the brightness at step 318.

At step 330, it is determined, e.g., using a processor and/or graphics unit, whether the sixth image includes duplication of the fourth image. In some embodiments, the determination may be made by comparing the brightness of the images and finding a match in brightness. At step 332, responsive to determining that the sixth image includes a duplication of the fourth image, a mask may be formed, e.g., window 290, and the duplicated image may be masked, e.g., window 290. It is appreciated that the mask may be formed using a processor and/or graphics unit. In some embodiments, the masking may be by superimposing window 290 over the duplicated image. At step 334, the eighth image that includes the masked window 290 may be rendered in the preview window, as shown by windows 205, 210, and 290. It is appreciated that the method described above may continue indefinitely.

Figure 4A:
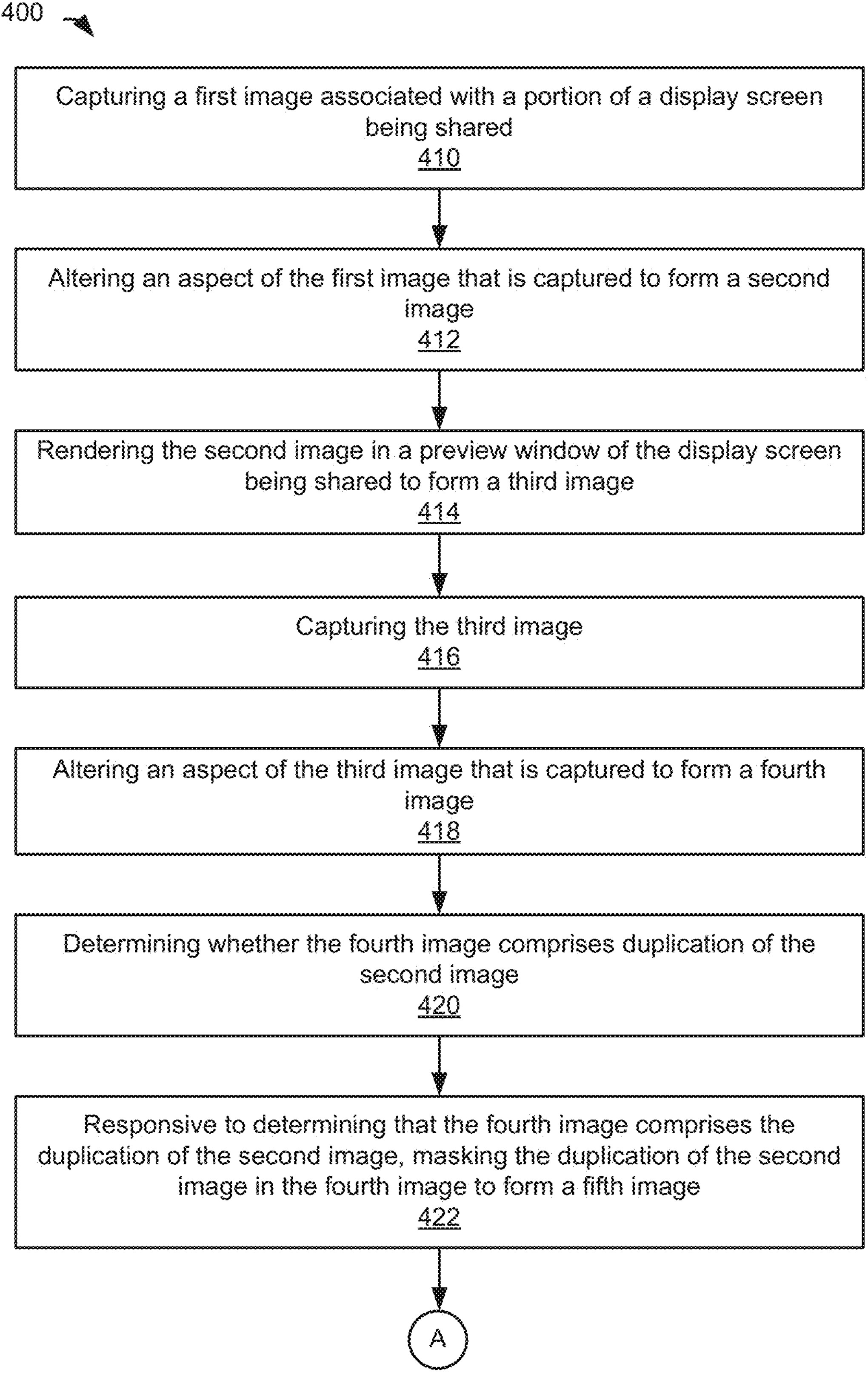
FIGS. 4A-4B are flow charts showing yet another example of method flow for masking video feedback loop in accordance with some embodiments.
Figure 4B:
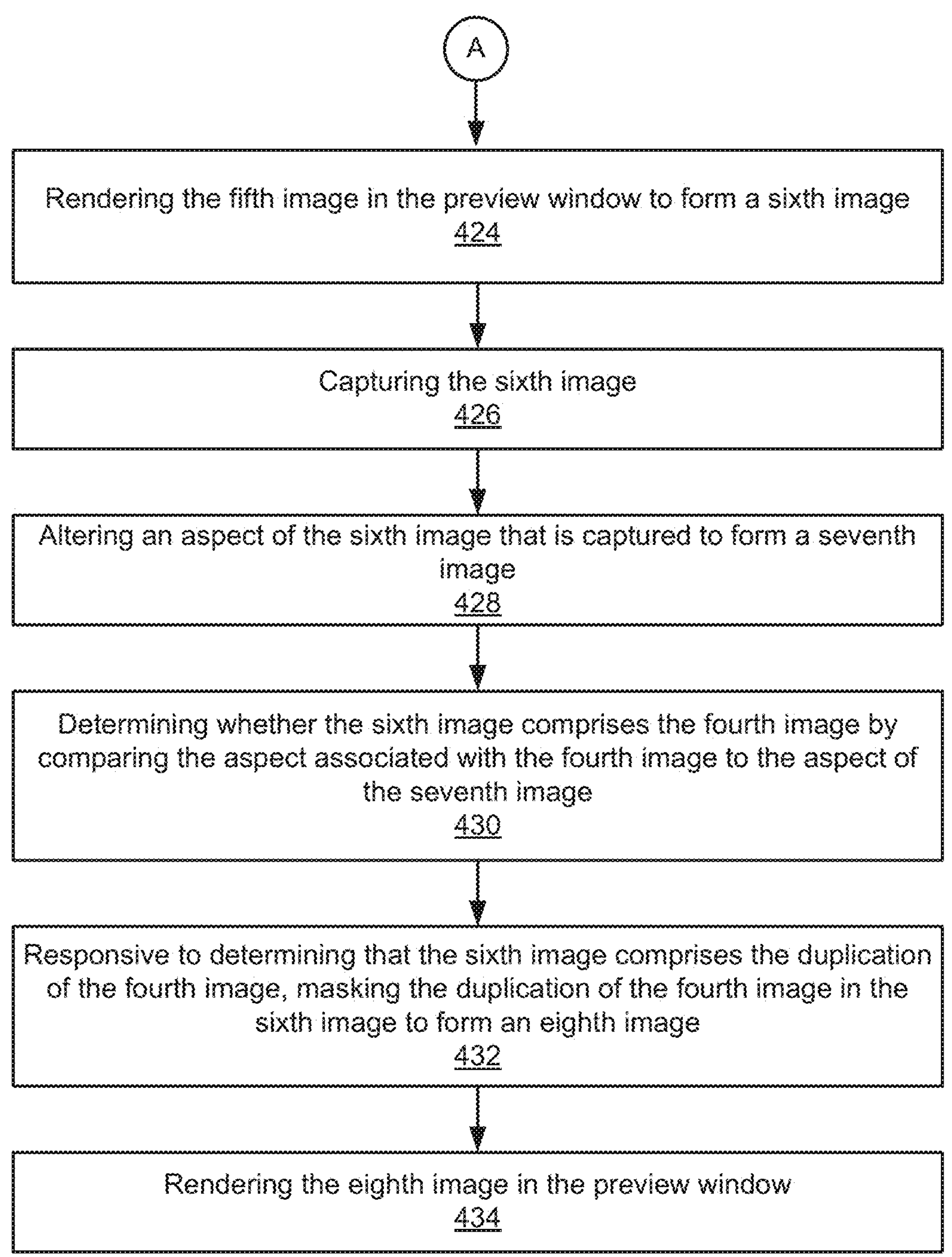

Referring now to FIGS. 4A-4B, yet another example of method flow 400 for masking video feedback loop in accordance with some embodiments is shown. At step 410 a first image associated with a portion of a display being shared is captured. For example, window 205 may be captured. For example, data associated with the screen being shared 205 is received by a processor, graphics unit, a memory component, etc., in order to be previewed in a preview window. The preview window is rendered by the processor and/or graphics unit on a display device and within the screen being shared. At step 412, an aspect of the first image that is captured is altered to form a second image, e.g., window 210. For example, the brightness, the color, the transparency, etc., associated with the first image may be altered. It is appreciated that while the alteration of the images is described with respect to altering the brightness, color, or transparency, the embodiments are not limited thereto and the example embodiments should not be construed as limited to brightness, color or transparency. For example, in some embodiments altering the image may be by inserting a substantially unperceivable pixel or removing a pixel in such a way that is substantially undetectable by human eye. For example, the alteration may be altered by the graphics unit and/or processor.

At step 414, the second image, e.g., window 210, may be rendered in the preview window. For example, a processor or a graphics unit may render the altered image in the preview window. Thus, the shared screen 205 is updated with the preview window 210 to form a third image. At step 416, the third image is captured and an aspect of the third image is altered to form a fourth image, at step 418. For example, data associated with the screen being shared 205 and 210 (i.e. third image) is received by a processor, graphics unit, a memory component, etc., in order to be previewed in the preview window. The preview window is rendered by the processor and/or graphics unit on the display device and within the screen being shared. It is appreciated that in some embodiments, the aspect that is altered at step 416 is opposite but equal in value to that at step 412. The a processor and/or graphics unit may be used for alteration of the content.

At step 420, it is determined whether the fourth image includes duplication of the second image. In some example embodiments, the determination is made by comparing the brightness, the color, the transparency, etc., of the images and finding a match. In some example embodiments a processor and/or graphics unit may be used to determine whether the fourth image includes duplication of the second image. At step 422, responsive to determining that the fourth image includes duplication of the second image, a mask is formed, e.g., by a processor and/or graphics unit associated with the user sharing the screen, to cover the duplicated second image. In other words, the mask is superimposed over the second image in the fourth image in order to hide the duplicated image(s). The masked duplicated image(s) form a fifth image. At step 424, FIG. 4B, the fifth image is rendered in the preview window.

At step 426, the sixth image is captured and at step 428 an aspect of the sixth image is altered to form a seventh image. Similar to above, a processor and/or graphics unit may receive content associated with the sixth image and they may alter the content to form the seventh image. It is appreciated that in some embodiments, the altered aspect in step 428 is opposite but equal in value to that at step 418. At step 430, it is determined, for example by using a processor and/or graphics unit, whether the sixth image includes the fourth image by comparing the aspects associated with each image and by finding a match. At step 432, responsive to determining that the sixth image includes the duplication of the fourth image, the duplicated image is masked form, e.g., by a processor and/or graphics unit, an eighth image. For example, a masking window may be superimposed the duplicated image(s). At step 434, the masked window in the preview window is rendered. It is appreciated that the method described in FIGS. 4A-4B may continue indefinitely.

It is appreciated that in FIGS. 4A-4B the capturing may capture the image in RGB format. Once the RGB format of the image is captured, it may be converted into YCrCb format where one of the parameters, e.g., Y, Cr, or Cb, may be altered. The altered YCrCb format may then be converted back into the RGB format. It is appreciated that human eye is more responsive to brightness changes than color changes. As such, the conversion between RGB and YCrCb format enables a less noticeable (to human eye) part of the rendered image, e.g., color, to be manipulated. In contrast, manipulating in RGB format may impact both the color and brightness. Accordingly, in one example of the embodiments, the color may be manipulated instead of the brightness as described above.

Figure 5:
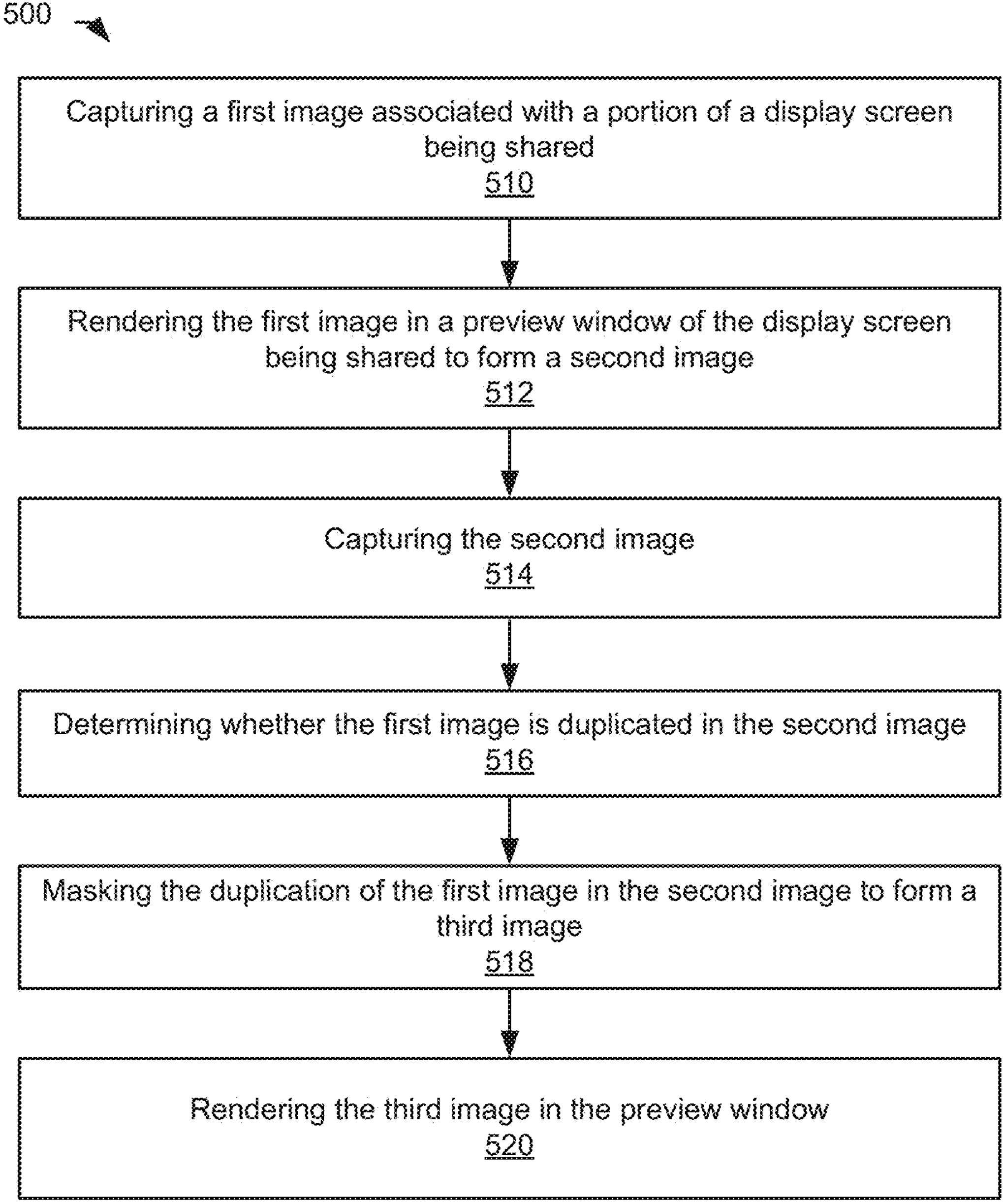
FIG. 5 is a flow chart showing yet another alternative example of method flow for masking video feedback loop in accordance with some embodiments.

Referring now to FIG. 5, yet another example of method flow 500 for masking video feedback loop is described in accordance with some example embodiments. At step 510, a first image associated with a portion of a screen being shared in captured. For example, window 205 may be captured. In other words, data associated with the first image that is associated with the portion of the screen being shared is received by a processor and/or graphics unit. In some example embodiments, the received data (i.e. captured data) is received from a graphics pipeline unit. It is appreciated that the capturing may be in any format, e.g., capturing in RGB format, YCrCb format, etc. The captured image is then rendered, e.g., by a processor and/or graphics unit, in the preview window being rendered on a display device to form a second image, at step 512. The second image is therefore an updated window 205 that displays the preview window 210. It is appreciated that the captured first image may be altered prior to rendering it in the preview window to form the second image. It is further appreciated that the altering may be substantially undetectable by human eye. Alteration of the image may be by a processor and/or graphics unit.

The second image is captured at step 514. In other words, data associated with the second image that is associated with the portion of the screen being shared as well as the preview window is received by a processor and/or graphics unit. In some example embodiments, the received data (i.e. captured data) is received from a graphics pipeline unit. At step 516, it is determined, e.g., using a processor and/or graphics unit, whether the first image is duplicated in the second image, hence the video feedback loop. In response to determining that the first image is duplicated in the second image, the duplicated first image is masked, e.g., by superimposing a masking window created by a processor and/or graphics unit, to form a third image, at step 518. The third image that includes the preview window with the masking window is rendered at step 520, e.g., using a processor and/or graphics unit. It is appreciated that the third image may be captured. In other words, data associated with the third image that is associated with the portion of the screen being shared as well as the preview window is received by a processor and/or graphics unit. In some example embodiments, the received data (i.e. captured data) is received from a graphics pipeline unit. It is further appreciated that the captured third image may be altered, e.g., by a processor and/or graphics unit, prior to rendering it in the preview window. It is further appreciated that the altering may be substantially undetectable by human eye. It is appreciated that the altering of the third image may be by the same amount but opposite to that of the alteration in the first image. In some embodiments, the alteration may be alteration of the brightness, alteration of the color, alteration of the transparency, etc.

It is appreciated that in some embodiments, a browser may provide an application programming interface (API) that describes the position of the browser window with respect to the display screen. The information from the API can be used to identify a portion of the shared screen where the video feedback loop occurs. The masking process occurs in order to mask the video feedback loop, as described above, once the portion of the shared screen where the video feedback loop is identified.

Figure 6:
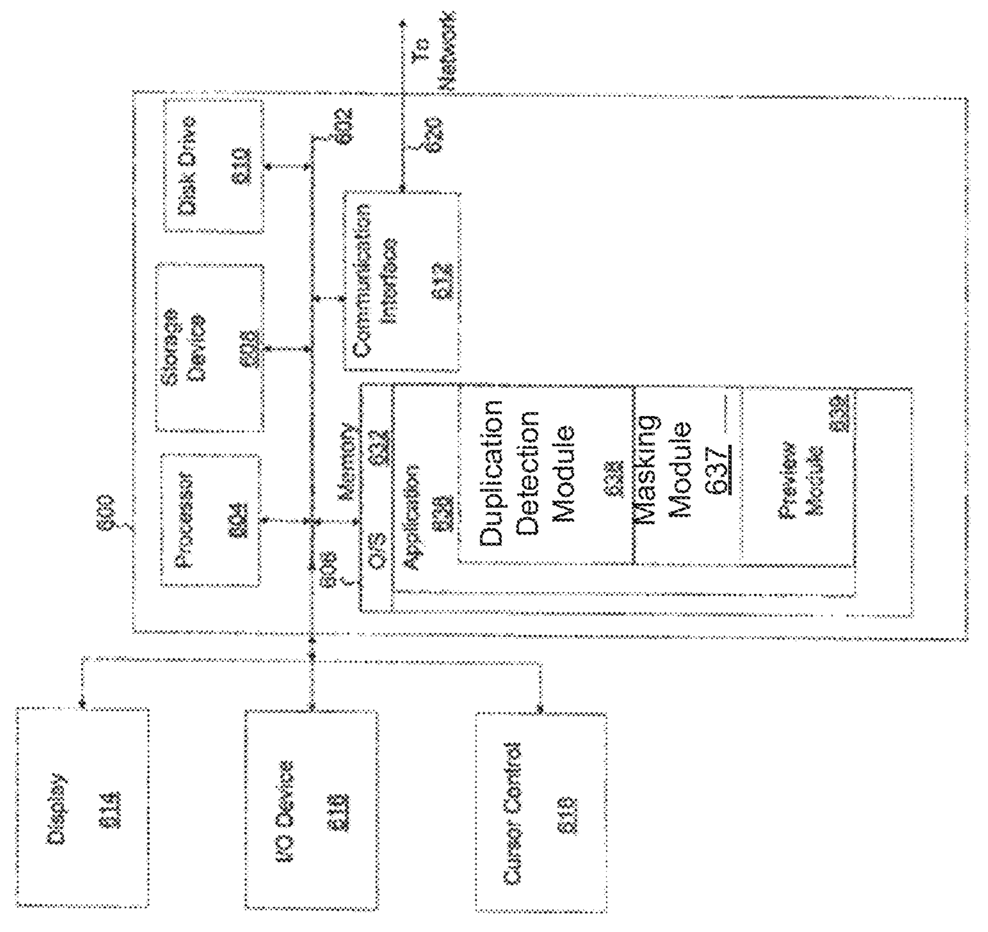
FIG. 6 is a diagram illustrating an example computer system suitable for masking video feedback loop in accordance with some embodiments.

Referring now to FIG. 6, an exemplary computer system 600 suitable for masking video feedback loop in accordance with some embodiments is shown. In some examples, computer system 600 can be used to implement computer programs, applications, methods, processes, or other software to perform the above-described techniques and to realize the structures described herein. Computer system 600 includes a bus 602 or other communication mechanism for communicating information, which interconnects subsystems and devices, such as a processor 604, a system memory ("memory") 606, a storage device 608 (e.g., ROM), a disk drive 610 (e.g., magnetic or optical), a communication interface 612 (e.g., modem or Ethernet card), a display 614 (e.g., CRT or LCD), an input device 616 (e.g., keyboard), and a pointer cursor control 618 (e.g., mouse or trackball). In one embodiment, pointer cursor control 618 invokes one or more commands that, at least in part, modify the rules stored, for example in memory 606, to define the electronic message preview process.

According to some examples, computer system 600 performs specific operations in which processor 604 executes one or more sequences of one or more instructions stored in system memory 606. Such instructions can be read into system memory 606 from another computer readable medium, such as static storage device 608 or disk drive 610. In some examples, hard-wired circuitry can be used in place of or in combination with software instructions for implementation. In the example shown, system memory 606 includes modules of executable instructions for implementing an operation system ("O/S") 632, an application 636 (e.g., a host, server, web services-based, distributed (i.e., enterprise) application programming interface ("API"), program, procedure or others). Further, application 636 includes a module of executable instructions for determining duplication of an image within the preview window (Duplication Detection module 638), as well as modules of executable instructions for masking the detected duplicated image within the preview window (masking module 637) and a preview module 639. The determining duplication of an image within the preview window module 638 includes instructions for identifying and determining images within the preview window that is being duplicated. The masking the detected duplicated image within the preview window module 637 can be configured to mask the determined duplicated imaged within the preview window. Preview module 639 includes instructions for managing the presentation of preview information, modified preview information, e.g., masked duplicated images.

The term "computer readable medium" refers, at least in one embodiment, to any medium that participates in providing instructions to processor 604 for execution. Such a medium can take many forms, including but not limited to, non-volatile media, volatile media, and transmission media. Non-volatile media includes, for example, optical or magnetic disks, such as disk drive 610. Volatile media includes dynamic memory, such as system memory 606. Transmission media includes coaxial cables, copper wire, and fiber optics, including wires that comprise bus 602. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 600. According to some examples, two or more computer systems 600 coupled by communication link 620 (e.g., LAN, PSTN, or wireless network) can perform the sequence of instructions in coordination with one another. Computer system 600 can transmit and receive messages, data, and instructions, including program code (i.e., application code) through communication link 620 and communication interface 612. Received program code can be executed by processor 604 as it is received, and/or stored in disk drive 610, or other non-volatile storage for later execution. In one embodiment, system 600 is implemented as a hand-held device. But in other example embodiments, system 600 can be implemented as a personal computer (i.e., a desktop computer) or any other computing device. In at least one embodiment, any of the above-described delivery systems can be implemented as a single system 600 or can implemented in a distributed architecture including multiple systems 600.

In view of the foregoing, examples of previewing a shared screen are described. Screen sharing systems can be implemented using real-time interfaces that are configured to control and manage communication dynamically over an IP network. Further electronic messaging systems can be implemented on computer readable medium using the modules as described above to preview screen sharing content. The described techniques can be used to emulate other electronic messaging technologies by receiving messages with generated message preview independent of content storing.

In other examples, the systems, as described above can be implemented from a personal computer, a computing device, a mobile device, a mobile telephone, a facsimile device, a personal digital assistant ("PDA") or other electronic device. Various embodiments can apply to any electronic screen sharing.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described described techniques can be implemented using various types of programming or formatting languages, frameworks, syntax, applications, protocols, objects, or techniques, including C, Objective C, C++, C#, Flex™, Fireworks™, Java™, Javascript™, AJAX, COBOL, Fortran, ADA, XML, HTML, DHTML, XHTML, HTTP, XMPP, and others. These can be varied and are not limited to the examples or descriptions provided.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A computer-implemented method, comprising:
- capturing a first image associated with a portion of a display screen being shared in an online environment;
- rendering the first image in a preview window of the display screen being shared, in the online environment, to form a second image;
- capturing the second image;
- determining whether the second image comprises a duplication of at least a portion of the first image;
- responsive to determining whether the second image comprises the duplication of at least the portion of the first image, masking the duplication of at least the portion of the first image in the second image to form a third image; and
- rendering the third image in the preview window.

2. The computer-implemented method of claim 1, wherein masking the duplication of at least the portion of the first image comprises superimposing a masking window.

3. The computer-implemented method of claim 1, wherein the first image is altered in response to capturing the first image.

4. The computer-implemented method of claim 1, wherein the second image comprises an updated window that displays the preview window.

5. The computer-implemented method of claim 3, wherein the altering of the first image is undetectable by human eye.

6. The computer-implemented method of claim 3, wherein the method further comprising: capturing the third image.

7. The computer-implemented method of claim 6, wherein the method further comprising: in response to capturing the third image, altering the third image, wherein the altering of the third image is opposite but equal in value to the altering of the first image.

8. A non-transitory, computer-readable medium, storing instructions that, when executed by one or more processors, cause the one or more processors to perform operations comprising:
- capturing a first image associated with a portion of a display screen being shared in an online environment;
- rendering the first image in a preview window of the display screen being shared, in the online environment, to form a second image;
- capturing the second image;
- determining whether the second image comprises a duplication of at least a portion of the first image;
- responsive to determining whether the second image comprises the duplication of at least the portion of the first image, masking the duplication of at least the portion of the first image in the second image to form a third image; and
- rendering the third image in the preview window.

9. The non-transitory, computer-readable medium of claim 8, wherein masking the duplication of at least the portion of the first image comprises superimposing a masking window.

10. The non-transitory, computer-readable medium of claim 8, wherein the first image is altered in response to capturing the first image.

11. The non-transitory, computer-readable medium of claim 8, wherein the second image comprises an updated window that displays the preview window.

12. The non-transitory, computer-readable medium of claim 10, wherein the altering of the first image is undetectable by human eye.

13. The non-transitory, computer-readable medium of claim 10, wherein the instructions further comprise capturing the third image.

14. The non-transitory, computer-readable medium of claim 13, wherein the instructions further comprise: in response to capturing the third image, altering the third image, wherein the altering of the third image is opposite but equal in value to the altering of the first image.

15. A system, comprising:
- one or more processors;
- a memory operatively connected to the one or more processors and storing instructions that, when executed by the one or more processors, cause the one or more processors to perform operations comprising:
- capturing a first image associated with a portion of a display screen being shared in an online environment;
- rendering the first image in a preview window of the display screen being shared, in the online environment, to form a second image;
- capturing the second image;
- determining whether the second image comprises a duplication of at least a portion of the first image;
- responsive to determining whether the second image comprises the duplication of at least the portion of the first image, masking the duplication of at least the portion of the first image in the second image to form a third image; and
- rendering the third image in the preview window.

16. The system of claim 15, wherein masking the duplication of at least the portion of the first image comprises superimposing a masking window.

17. The system of claim 15, wherein the first image is altered in response to capturing the first image.

18. The system of claim 15, wherein the second image comprises an updated window that displays the preview window.

19. The system of claim 17, wherein the altering of the first image is undetectable by human eye.

20. The system of claim 15, wherein the instructions further comprise capturing the third image.

* * * * *